May 28, 1935.  M. F. BATES  2,003,270

FOLLOW-UP SYSTEM FOR MAGNETIC COMPASSES

Filed Jan. 11, 1934  3 Sheets-Sheet 1

INVENTOR
MORTIMER F. BATES
BY
Herbert H. Thompson
HIS ATTORNEY.

May 28, 1935.  M. F. BATES  2,003,270

FOLLOW-UP SYSTEM FOR MAGNETIC COMPASSES

Filed Jan. 11, 1934  3 Sheets-Sheet 2

INVENTOR
MORTIMER F. BATES
BY
Herbert H. Thompson
HIS ATTORNEY

May 28, 1935.  M. F. BATES  2,003,270
FOLLOW-UP SYSTEM FOR MAGNETIC COMPASSES
Filed Jan. 11, 1934  3 Sheets-Sheet 3
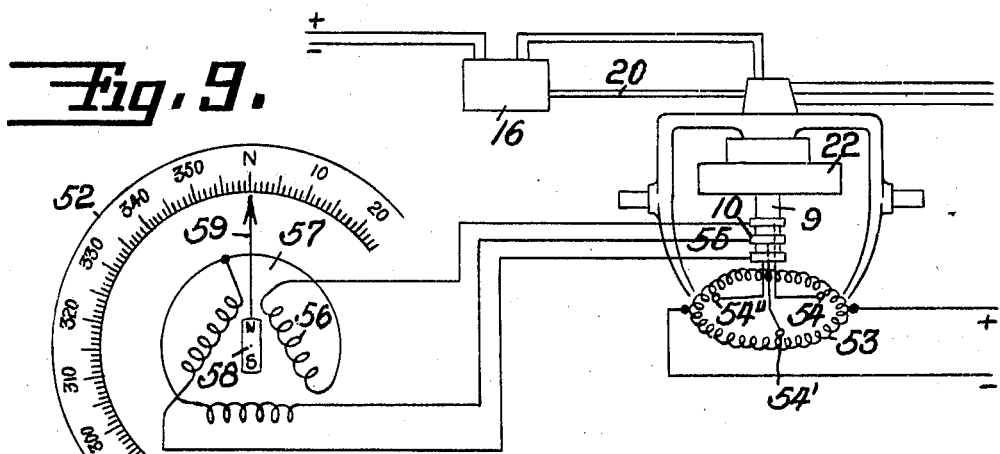
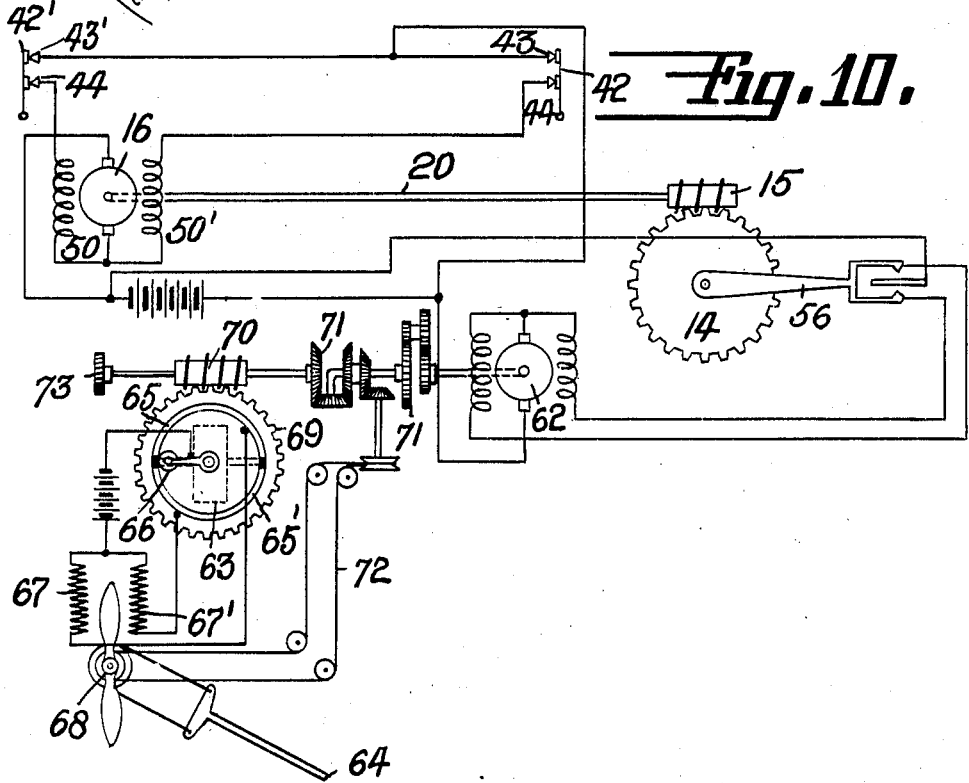
INVENTOR
MORTIMER F. BATES
BY
Herbert H. Thompson
HIS ATTORNEY Patented May 28, 1935

2,003,270

UNITED STATES PATENT OFFICE 2,003,270

FOLLOW-UP SYSTEM FOR MAGNETIC COMPASSES

Mortimer F. Bates, Brooklyn, N. Y., assignor to Sperry Gyroscope Company, Inc., Brooklyn, N. Y., a corporation of New York Application January 11, 1934, Serial No. 706,207

6 Claims. (Cl. 33—204)

This invention relates to magnetic compasses and more especially to a means for controlling another device from a magnetic compass without disturbing the latter. For instance, it is often desirable to locate the magnetic compass remote from magnetic influences in an airplane or ship and to actuate therefrom an indicator at a distance, or it may be desirable to effect the automatic steering of aircraft or ship from a magnetic compass by means of a power actuated remote control device either in conjunction with or without a gyroscopic directional device. My invention further relates to a means for improving the accuracy of magnetic compasses by relieving the pivots of the load due to the weight of the magnetic element.

Referring to the drawings illustrating the preferred form my invention may assume, Fig. 1 is a side elevation, partly in section, of my improved magnetic compass with a follow-up device for remote control.

Fig. 9 is a schematic view and wiring diagram showing how my invention may be employed to actuate the remote repeater compass.

Fig. 10 is a wiring diagram of my invention also showing how it may be employed to automatically steer an aircraft in conjunction with a directional gyroscope.

Figure 1:
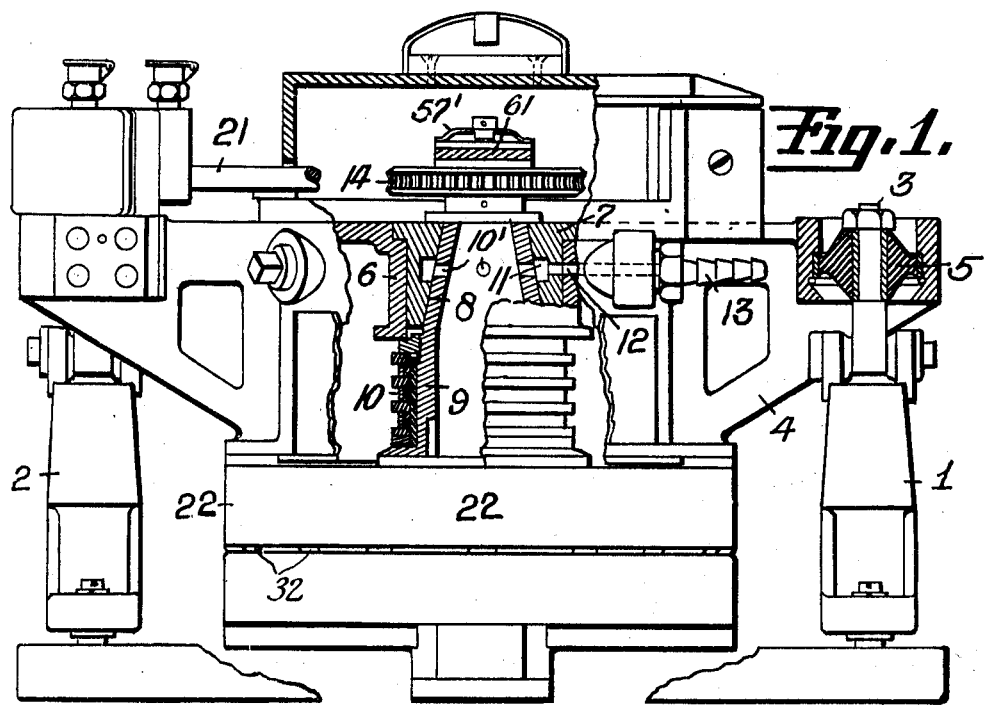
Figure 2:
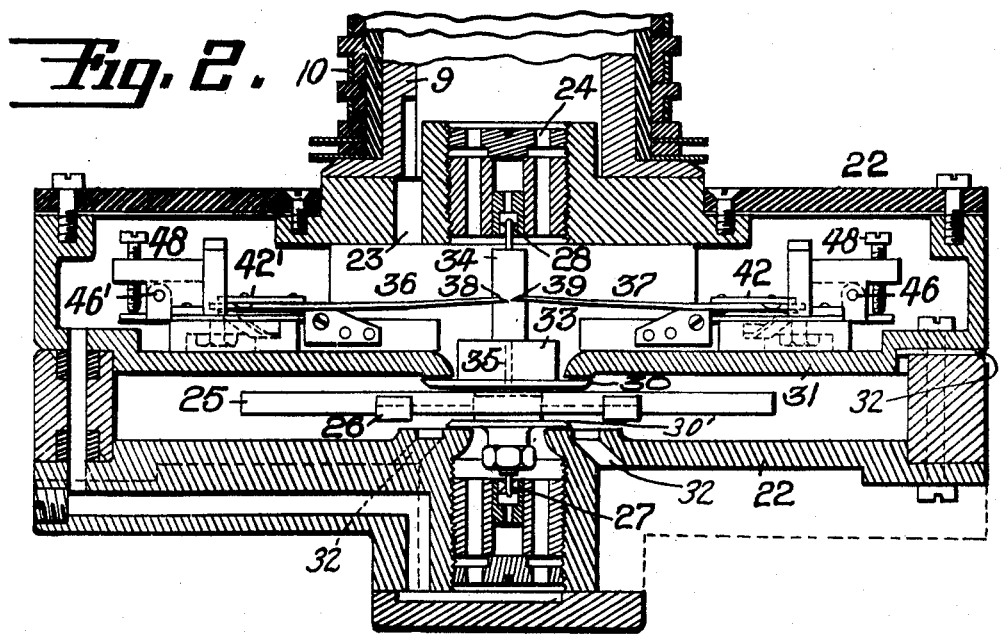
Fig. 2 is a vertical section on a larger scale of the compass portion of the instrument located in the base of the device shown in Fig. 1.
Figure 3:
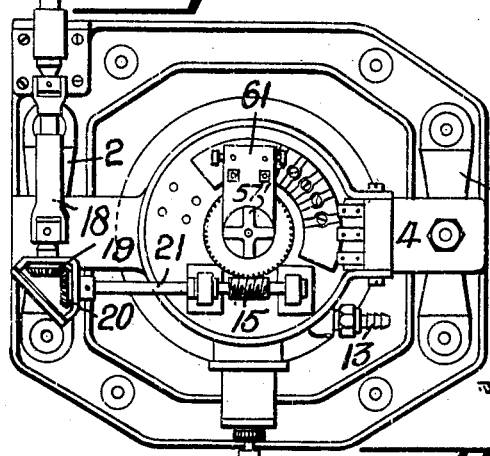
Fig. 3 is a plan view of the instrument shown in Fig. 1 on a smaller scale.
Figure 4:
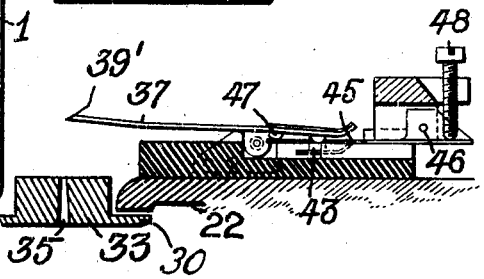
Fig. 4 is a detail of one of the air actuated shutters or levers for governing the power driven follow-up and remote control devices, the contact being shown in the closed position.
Figure 5:
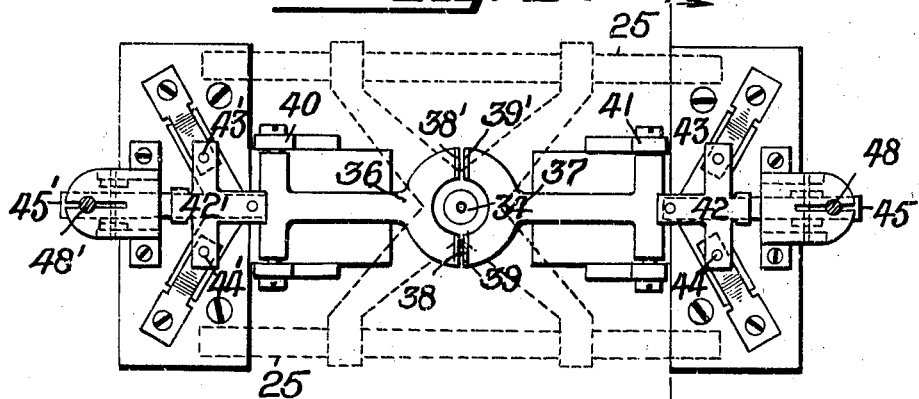
Fig. 5 is a plan view of the magnetic compass shown in Fig. 2 with the cover removed.

Referring first to Figs. 1, 2 and 3, my compass is shown as supported in a shock proof manner on a pair of cushioned supports 1 and 2 on which are pivoted upright pins 3 which support the main frame 4 by means of a rubber mounting 5. Said support is shown as provided with a central hub 6 in which is mounted a sleeve 7 having a tapered bearing 8 therein within which is journalled the main supporting member 9 for the compass proper. Said member is shown as exteriorly provided with slip rings 10 by means of which current is led into the magnetic compass and also with apertures 10' adjacent its top which communicate with a channel 11 within sleeve 7, which in turn communicates with passageway 12 leading to pipe or hose coupling 13 by means of which air may be continuously withdrawn from the interior of the compass casing. Member 9 is shown as rotated by means of a worm gear 14 secured to the top thereof and which is turned from the worm 15 driven in any suitable manner by the follow-up motor 16 (Figs. 9 and 10).

As shown in Fig. 3, the drive from the motor is effected through universally coupled shafts 17 and 18, the latter driving bevel gear 19 which in turn drives bevel gear 20 on a shaft 21 of the worm 15. The entire casing 22 for the magnetic compass element is suported by a member 9 so as to rotate therewith, the casing being shown as provided with apertures 23 and 24 at the top so that air may be withdrawn from the interior of the case through the hollow sleeve 9. The magnetic element proper is shown as comprising one or more bar magnets 25 supported in a frame 26, which in turn is journalled in upper and lower jeweled bearings 27 and 28 within the casing. Said element is also preferably provided with a disc 30 which normally closely overlies but does not touch the lower inner portion or hub of a central partition 31 within the casing. It will readily be seen that as air is withdrawn through member 9 and admitted through apertures 32 in the base of the instrument, that a superior pressure will exist underneath the disc so as to lift or tend to lift the magnetic element, thereby relieving the bearings 27 and 28 of any gravitational load. The pressure underneath the disc 30, however, may be greater than necessary to overcome the weight of the magnetic element because its effective diameter is determined by the necessary off center position of orifice 35, hereinafter described. Therefore, it may be necessary to offset this pressure by a second and smaller disc 30' acting in the direction of gravity, the difference in effective areas of 30 and 30' being exactly calculated to equal the weight of the magnetic element when the operating vacuum is normal.

Figure 6:
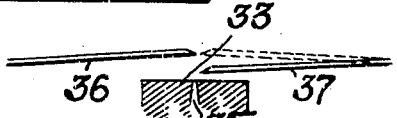
Fig. 6 is a diagrammatic view showing the position assumed by the shutters when the air jet is displaced.
Figure 7:
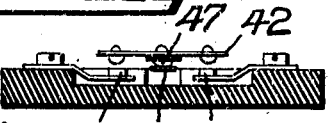
Fig. 7 is a section taken approximately on line 7—7 of Fig. 5.

Said disc is also provided with a hub-like extension 33 from which rises the stem 34 carrying bearing pin 28. Both the hub and disc are provided with an eccentric bore or orifice 35 so as to permit a jet of air to be discharged upwardly therefrom. Above said jet are a pair of light, pivoted air paddles or vanes 36 and 37 each provided with a semi-annular or forked end to encircle the central stem 34. One or both ends of both forks are provided with closely spaced knife edges 38 and 39 and 38' and 39'. The vanes or paddles 36 and 37 are pivoted at 40 and 41 respectively, and are shown as having riveted to their rear ends T-shaped contact pieces 42, 42' which, when one vane is lowered, bridges stationary contacts 43 and 44 to complete a circuit directly or indirectly to drive the follow-up motor 16 in one direction, while the other vane drives the motor in the other direction. Each of the aforesaid paddles is normally yieldingly pressed downwardly by light leaf spring 45 pivoted at 46 and bearing at one end against the under surface of one of the rivets 47 attaching T-shaped contact 42 to the vane. Said spring at the other end bears against an adjustable set screw 48 by means of which the force tending to hold the outer end of the paddle or shutter down may be accurately adjusted. Normally the air jet strikes both shutters equally, holding both upwardly as shown in Fig. 2, a portion of the air escaping between the knife edges of the shutters 36, 37. In case, however, of relative turning of the magnetic element and follow-up support (for example, so that the magnetic element moves to the left in Fig. 6) the air jet will no longer engage the end of the paddle 36 with sufficient force to hold the same elevated against the action of the leaf spring. The shutter will, therefore, fall to the full line position in Fig. 6 and thus break the circuit between contacts 43 and 44. Preferably the upper adjacent edges of the two paddles are beveled or sharpened so that the air passing between the paddles, as shown in Fig. 6, exerts a downward force on the lower lever, thus increasing the sensitiveness of the control.

As shown, the motor 16 is provided with opposite field windings 50, 50' which are normally equally excited when the contacts are closed on both sides, the motor standing still under those circumstances. When, however, due to the lowering of one paddle, 36 for example, contacts 43, 44 are broken, the circuit through the field 50' will be broken, thus leaving only the field 50 in control so that the motor is driven in the proper direction to cause the member 9 and the supporting casing 22 to turn until equilibrium is again restored. Obviously the reverse action takes place when only the shutter 37 is lowered.

Since the follow-up support is power driven, obviously repeater devices may be controlled therefrom without effecting the magnetic compass. Thus Fig. 9 shows diagrammatically how a repeater compass 52 may be driven from the magnetic compass by means of any suitable repeater system. As shown, a resistance coil 53 is mounted on a fixed part around the compass, over which travel three equi-distant brushes 54, 54' and 54'' secured to the member 9. The potential from said brushes is picked off through the slip rings 10 and brushes 55 contacting therewith and carried to three field windings 56 on repeater motor 57, said motor having a polarized armature 58 to which the compass pointer 59 may be secured.

Figures 8, 11:
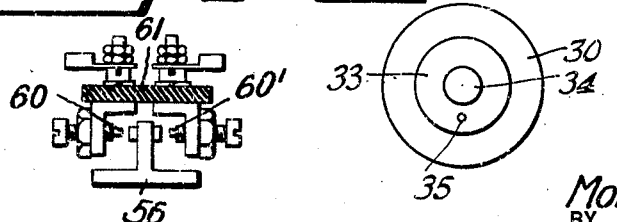
Fig. 8 is a detail of the follow-up contact at the top of the instrument.
Fig. 11 is a detail showing a plan view of the disc containing the control jet in the magnetic element.

My invention may also be employed for controlling the rudder of a craft for automatic steering. One method of accomplishing this purpose is illustrated diagrammatically in Fig. 10. On top of member 9 is mounted a contact arm 56 secured to member 9 by a spring pressed slip friction connection 57' (see Figs. 1, 3 and 8) so that said member will revolve with member 9 until it strikes fixed stops in either direction. Such stops are shown as a pair of contacts 60 and 60' secured to a fixed part 61 on the compass framework. Said contacts are shown in circuit with a reversible motor 62 which may control the rudder directly or indirectly. Preferably the rudder is controlled jointly by the magnetic compass and a directional gyroscope 63 as generally indicated in the prior application of Elmer A. Sperry, Jr., now Patent No. 1,982,702, dated December 4, 1934, for Gyro pilots for aircraft. According to this system, the gyroscope controls the rudder 64 through contacts 65, 65' (or other suitable means) on the rotatably mounted base 69 of the gyroscope and a cooperating contact 66 secured to the vertical ring of the gyroscope. As shown, said contacts control solenoid operated clutches 67, 67' for turning the rudder from wind driven servo motor 68 in either direction. The magnetic compass control is shown as turning the base 69 through a worm 70. Preferably high reduction gearing 71 is placed between the motor shaft and the worm so that the main control is effected from the gyroscope subject to correction by the average position of the magnetic compass. There is also shown interposed a differential 71 by means of which a follow-back connection 72 is introduced from the servo motor. There is also shown a setting knob 73 by means of which the course may be changed at will. Obviously other types of servo motor control may be employed, if desired.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. A remote or power control for magnetic compasses and the like comprising the combination with the magnetic needle element, a disc thereon, means for maintaining a superior air pressure thereunder than above the same to support the weight of said element, said element also having an eccentric aperture through which some of said air pressure escapes, a pair of biased pivoted vanes, the ends of which lie adjacent said aperture, and power means controlled by the relative movement of said vanes.

2. A remote or power control for magnetic compasses and the like comprising the combination with the magnetic needle element, a disc thereon, means for maintaining a superior air pressure thereunder than above the same to support the weight of said element, said disc also having an aperture eccentrically positioned therein through which some of said air pressure escapes, a pair of biased pivoted vanes, the ends of which lie adjacent said aperture, and power means controlled by the differential movement of said vanes as the eccentric aperture moves under one more than the other.

3. A remote or power control for magnetic compasses and the like comprising the combination with the rotatable element supporting the needle, means for maintaining a superior air pressure thereunder than above the same, said element also having an aperture eccentrically positioned therein through which some of said air pressure escapes, a pair of biased pivoted vanes, the ends of which lie adjacent said aperture, and power means controlled by the differential movement of said vanes as the eccentric aperture moves under one more than the other.

4. In a follow-up system for sensitive rotatable elements, the combination with a housing for the same, means for maintaining a differential air pressure within and without the housing, discs on said element for substantially closing said housing but permitting a flow of air between the same and the housing to float the element on air bearings, an aperture in said element leading from within to without said housing, a pair of paddles pivoted to each side of said aperture and having the inner edges lying normally equally in the path of the air stream from said aperture, means normally partially biasing each paddle against said air stream, power means brought into action by the differential movement of the paddles for turning said housing to follow said element.

5. In a follow-up system for sensitive rotatable elements, the combination with a housing for the same, means for maintaining a differential air pressure within and without the housing, discs on said element for substantially closing said housing but permitting a flow of air between the same and the housing to float the element on air bearings, an aperture in said element leading from within to without said housing, a pair of paddles pivoted to each side of said aperture and having the inner edges lying normally equally in the path of the air stream from said aperture, means normally partially biasing each paddle against said air stream, power means brought into action by the differential movement of the paddles for turning said housing to follow said element, and a transmitter actuated thereby for transmitting the readings to a distance.

6. A remote or power control for magnetic compasses and the like comprising the combination with the pivoted magnetic needle element, a disc thereon, means for maintaining a superior air pressure under said disc than above it to support the weight of said element, said element also having an aperture eccentric to the pivot axis of said element through which some of said air pressure escapes, and a second disc on said element adapted to exert a down pressure thereon to offset a too great lifting power by said first disc.

MORTIMER F. BATES.